Sept. 15, 1959  R. A. F. JACKSON  2,904,666
ELECTRIC SPACE HEATERS
Filed Nov. 8, 1957  3 Sheets-Sheet 1
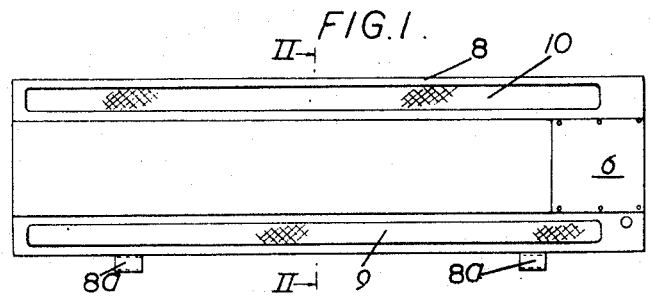
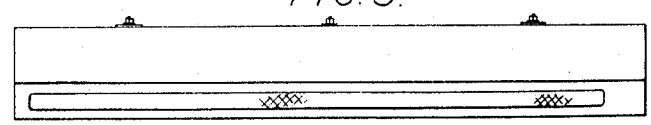
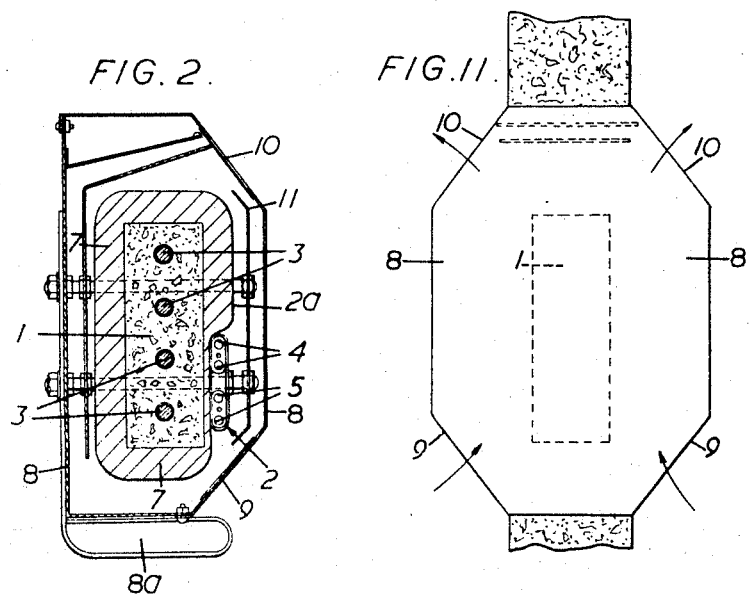
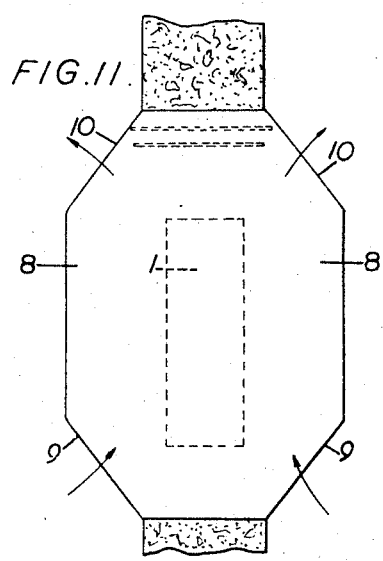
Inventor
ROBERT ALFRED FREDERICK JACKSON,
By John B. Brady
Attorney Inventor
ROBERT ALFRED FREDERICK JACKSON,

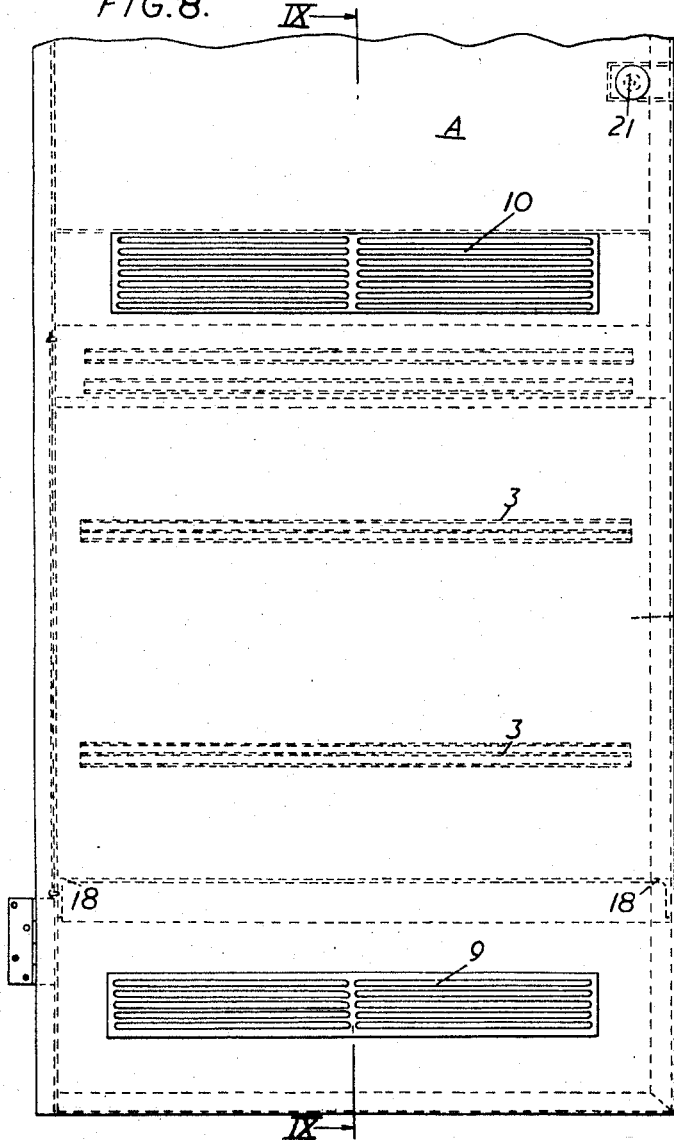
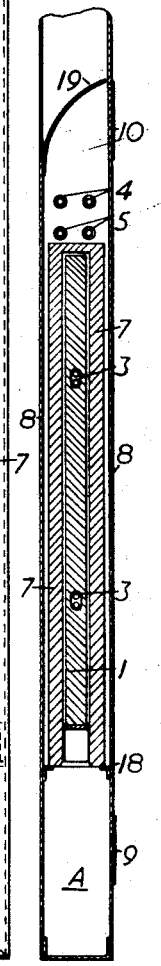
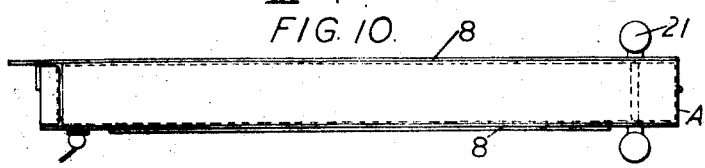

United States Patent Office 2,904,666
Patented Sept. 15, 1959

2,904,666

ELECTRIC SPACE HEATERS

Robert Alfred Frederick Jackson, Glasgow, Scotland

Application November 8, 1957, Serial No. 695,401

6 Claims. (Cl. 219—34)

Vendors of electricity are giving consideration to the possibility of providing for electric space heating under conditions that enable the heating installations to act as off-peak load builders, and to this end they are offering cheaper rates if the installations are arranged to be switched-off positively during predetermined peak periods. For example, the vendors for a particular area may decide that such heating installations be off from 8 a.m. to 10 a.m. and from 3 p.m. to 5:30 p.m. under control of appropriate time switches.

Electric storage heaters have been proposed to take advantage of night storage heating up to a period of say 15 hours, but these heaters are cumbersome and heavy and do not generally afford a sufficient flexibility of control having regard to possibly unusual or wild fluctuations in the weather for the particular season.

My present invention provides a light-weight electric storage heater so constructed that emission of the stored heat by radiation and convection can be determined to take any time up to say four or five hours.

The invention further provides a heater as aforesaid which incorporates additional heating elements for heating by convection and radiation and in which the total rate of heat emission from the heater by convection relative to the rate of radiant heat emission can be set as required to give the most economical space heater according to the geographical location of the heater.

The invention further provides a heater as aforesaid in which the rate of emission of stored heat is automatically adjustable to within close limits in dependence on the prevailing room temperature.

A storage type electric space heater in accordance with the invention comprises a heat-insulated heat storage medium (such as a heat-insulated concrete block rectangular in section); an assembly of withdrawable electric heating elements embodied in the insulated heat storage medium; at least one additional electric heating assembly mounted adjacent the insulated heat storage medium; a casing surrounding the insulated heat storage medium and the additional heating assembly with an intervening air space, said casing presenting a lower air inlet and an upper air outlet; and a double contact thermostat adjacent the heat storage medium which thermostat in one position shuts off current to the heating assembly therein and simultaneously cuts in the additional heating assembly.

Preferably there are two additional electric heating assemblies mounted adjacent the heat-insulated storage medium, one energised under control of said double contact thermostat and the other energised independently of said thermostat.

An adjustable heat-insulated baffle may be provided to co-act with the front of the heat storage medium.

Each heating element assembly preferably comprises split metal tubes connected by end plates, and an electric resistant element within each tube supported therein by ceramic beads.

The invention will be fully understood from the following description and the accompanying drawings which show some embodiments by way of example.

Figs. 1 to 3 show one embodiment; Fig. 1 being a front elevation; Fig. 2 a section on line II—II of Fig. 1; and Fig. 3 a plan view.

Figs. 8 to 10 show another embodiment incorporated in a door, Fig. 8 being an elevation; Fig. 9 a section on line IX—IX of Fig. 8; and Fig. 10 a plan view.

Fig. 11 is an outline view of a twin type heater incorporated in a partition wall.

The same references are used throughout to denote the same or similar parts.

Figure 4:
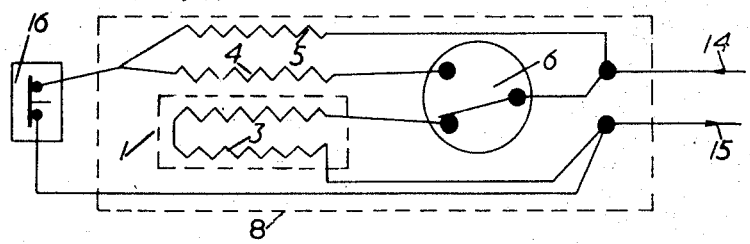
Figs. 4 to 7 are wiring diagrams illustrative of the manner of operation of the heater.

Referring now more particularly to the heater shown by Figs. 1 to 3, the storage medium is a concrete block 1 measuring about 5" high x 2½" wide x 45" long and heat-insulated all round with glass wool or similar material 7. The front of the heat-insulated block has a recess 2 about 2" deep. The front 2a of the heat-insulated block above this recess may be plain, as shown, or it may present vertical castellations ½" wide x ½" deep with ½" between them.

Embodied in the block, which weighs about only 45 lbs., is an assembly 3 of electric heating elements constructed in the manner already described and with a loading of say 1400 watts. The recess 2 in the block is occupied by two additional electric heating assemblies 4 and 5, also constructed as already described, one assembly, 4, with a loading of say 800 watts and the other assembly, 5, with a loading of say 200 watts.

Adjacent the block 1 is a double contact thermostat 6 which shuts off the current to the heating assembly 3 in the block at a predetermined temperature, say 600° F. and simultaneously switches in the 800 watts additional heating assembly 4.

The thickness of the glass wool or similar material 7 controls the desired heat leakage from the block which is housed in a metal casing 8 so as to leave an intervening air space, said casing having a bottom front air inlet 9 and a top front air outlet 10. An insulated baffle 11 that co-acts with the upper front surface 2a of the block is adjustably mounted within this casing.

The casing 8 has feet 8a.

Figure 5:
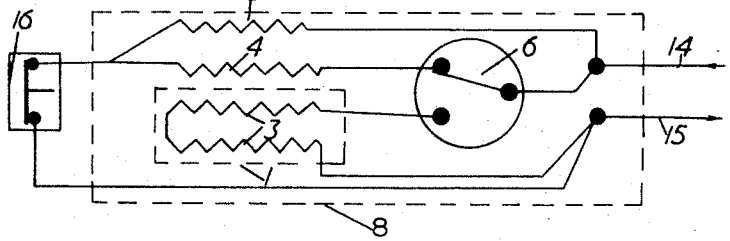
Figure 6:
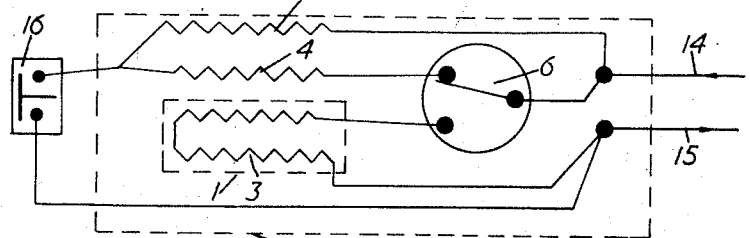
Figure 7:
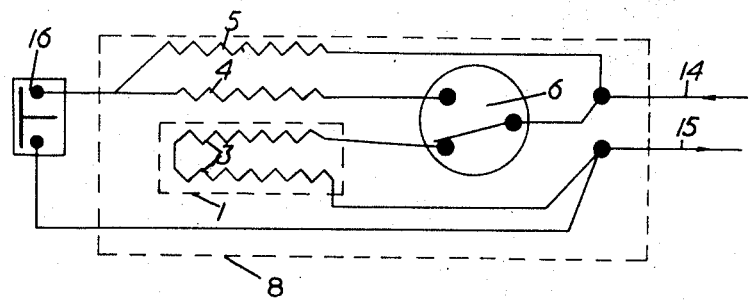

In use the heater is connected up with the mains feeders 14, 15 and with a room thermostat 16 in the manner clearly shown in Figs. 4 to 7.

Assume now that the described heater is installed in an office which is occupied from say 9 a.m. to 5:30 p.m. with a time switch control (not shown) arranged to switch on current to the heater at 4 a.m. The arrangement is such that at this time (Fig. 4) there will be 1400 watts heating the block while the additional heating assembly 5 of 200 watts will be operative, the air heated thereby passing up the front 2a of the block and out of the heater casing 8 at 10 in order to warm up the room, helped by the slight "leakage" emission from the heat storage block. When under these conditions the block reaches a temperature of 600° F. with say 3 or 4 kilowatt hours stored the double contact thermostat 6 cuts out the supply to the 1400 watt heating assembly in the block and switches on the second additional heating assembly 4 of 800 watts (Fig. 5) making a total loading of 1000 watts given off for direct heating of the room. The two heating assemblies 4, 5 are controlled by the room thermostat 16 so that by 8 a.m. the room would be up to temperature and the block 1 would have say 3 kilowatt hours of storage. At this time the time-switch operates to cut off the supply whereupon the room temperature is maintained until say 10 a.m. solely by the emission of stored heat from the block. At 10 a.m. current is again switched on and the described operation is repeated until say 3 p.m. when again the supply is switched off by the time switch.

If while current is switched on to the heater the block is fully heat charged and the room is up to temperature, the room thermostat will open (Fig. 6) and all three heater assemblies will be cut off. If on the other hand while current is switched on to the heater the block is not fully heat charged but the room is up to temperature, the room thermostat will open (Fig. 7) to cut out the heaters 4 and 5 while the double contact thermostat will assume a position to pass current to the block heaters 3.

A heater as described will make obsolescent the methods of heating buildings by either floor or roof heating both of which are high in capital and operating costs. Owing to the great mass of material which has to be used for storage uncomfortable conditions are created and there is no known method of successful heat control. The heater herein described can be produced and installed at a fraction of the cost of floor or roof heating and it effects a very considerable saving on electricity consumption; moreover it can be adjusted to meet all the present conditions of power supply and can take care of any further developments that may arise from time to time. As an example consider a room of $10' \times 12' = 120$ square ft. of floor area $\times 8$ ft. high $=$ a space of 960 cubic ft. The usual loading for underfloor heating is about 15 watts per square ft. of floor area so $120 \times 15 = 1.8$ kw. which gives a floor temperature of approximately 80° F. A concrete floor 120 square ft. $\times 2\frac{1}{2}''$ thick $= 25$ cubic feet and weighs about 3750 lbs.

With this weight or mass of concrete it can be readily appreciated that it is impossible to have accurate heat control and that the operative cost must be higher than with direct or semi-storage methods. With the heater herein described and weighing only approximately 50 lbs. the operating costs show considerable savings. It may have a loading of say 1.6 kw. for a room of 1500 cubic foot with a stored capacity of 2 kw., the design being such as to allow approximately .4 kw. to be dissipated per hour over the cut off period. The emission of .4 kw. is more than ample to maintain the room at the desired temperature to which it would be brought before the time switch cuts off the supply for a period. In the initial heating up of the room say from 4 a.m. the storage block would be up to the cut off temperature in approximately two hours when the 800 watts heating assembly would come in assisting the 200 watt heating assembly in giving off direct heating of $800 + 200$ watts $= 1000$ watts per hour. As the air from these assemblies passes up over the front 2a of the heat storage block this helps to retain the heat in the block until either the room thermostat or the time switch cuts off the supply. The front insulated adjustable baffle is closed against the front 2a of the storage block on say a 4 hour cut off of supply. Where the cut off period is only say two hours this baffle may be adjusted to say one half inch off the front face 2a. The flexibility of control of this heater is practically unlimited as the storage capacity can be increased or decreased by weight or by adjusting the loading of the block up or down, or a further adjustment can be made by the two direct heating assemblies to meet any condition that a supply company could impose and at the same time put this heater in a position to get the cheapest rates available.

A storage heater in accordance with the invention may be incorporated in a door and arranged so that either both sides of the door have convector openings, or one side has convector openings and the other side a radiant panel. In the embodiment of this kind illustrated by Figs. 8 to 10, the direct heaters 4 and 5 are disposed above the block 1. The heater is supported inside the door A on support angles 18. 19 denotes a deflector above the heaters 4 and 5, and 21 denotes the door handle.

An adjustable louvre (not shown) may be provided for the convector side of the heater and arranged when closed to operate a switch to cut off part or all of the loading.

In Fig. 11 is shown merely in outline a form of the heater located in an aperture in a wall or partition separating two rooms or compartments, and arranged to heat both. If desired the heater casing may have heat insulated closures for the heated air outlets so that when desired either room or compartment may be shut off from the heating elements.

From the foregoing it will be apparent that storage heaters in accordance with the invention may be made in various forms. The details of construction may also be varied within the scope of the invention.

I claim:

1. A storage type electric space heater comprising a heat insulated heat storage medium; an assembly of withdrawable electric heating elements embodied in the insulated heat storage medium; at least one additional electric heating assembly mounted adjacent said insulated heat storage medium; a casing surrounding said insulated heat storage medium and said additional heating assembly with an intervening air space, said casing presenting near its bottom an air inlet and at a higher level an air outlet; insulated terminals mounted on the casing for connection to electric supply mains; and a double contact thermostat adjacent said heat storage medium effective to connect said terminals to said heating assembly in said heat storage medium and alternately to said additional heating assembly dependently on the temperature of said heat storage medium.

2. A storage type electric space heater comprising a heat insulated heat storage medium; an assembly of withdrawable electric heating elements embodied in the insulated heat storage medium; at least two additional electric heating assemblies mounted adjacent said insulated heat storage medium; a casing surrounding said insulated heat storage medium and said additional heating assemblies with an intervening air space, said casing presenting near its bottom an air inlet and at a higher level an air outlet; insulated terminals mounted on the casing for connection to electric supply mains; a double contact thermostat adjacent said heat storage medium effective to connect said terminals to said heating assembly in said heat storage medium and alternately to one of said additional heating assemblies dependently on the temperature of said heat storage medium and means connecting said terminals to the other of said additional heating assemblies independently of said thermostat.

3. A storage type electric space heater comprising a heat insulated heat storage medium; an assembly of withdrawable electric heating elements embodied in the insulated heat storage medium; at least one additional electric heating assembly mounted adjacent said insulated heat storage medium; a casing surrounding said insulated heat storage medium and said additional heating assembly with an intervening air space, said casing presenting near its bottom an air inlet and at a higher level an air outlet; insulated terminals mounted on the casing for connection to electric supply mains; an adjustable heat insulated baffle in said air space; and a double contact thermostat adjacent said heat storage medium effective to connect said terminals to said heating assembly in said heat storage medium and alternately to said additional heating assembly dependently on the temperature of said heat storage medium.

4. A storage type electric space heater comprising a heat insulated heat storage medium; an assembly of withdrawable electric heating elements embodied in the insulated heat storage medium; at least two additional electric heating assemblies mounted adjacent said insulated heat storage medium; a casing surrounding said insulated heat storage medium and said additional heating assemblies with an intervening air space, said casing presenting near its bottom an air inlet and at a higher level an air outlet; insulated terminals mounted on the casing for connection to electric supply mains; an adjustable heat insulated baffle in said air space; a double contact thermostat adjacent said heat storage medium effective to connect said terminals to said heating assembly in said heat storage medium and alternately to one of said additional heating assemblies dependently on the temperature of said heat storage medium; and means connecting said terminals to the other of said additional heating assemblies independently of said thermostat.

5. A storage type electric space heater comprising a heat insulated heat storage medium; an assembly of withdrawable electric heating elements embodied in the insulated heat storage medium; at least one additional electric heating assembly mounted adjacent said insulated heat storage medium; a casing surrounding said insulated heat storage medium and said additional heating assembly with an intervening air space, said casing presenting near its bottom an air inlet and at a higher level an air outlet; insulated terminals mounted on the casing for connection to electric supply mains; and a double contact thermostat adjacent said heat storage medium effective to connect said terminals to said heating assembly in said heat storage medium and alternately to said additional heating assembly dependently on the temperature of said heat storage medium; each of said heating elements comprised of spaced end plates, split metal tubes between said end plates, an electric resistance element in each tube, and ceramic beads supporting said element in said tube.

6. A storage type electric space heater comprising a heat insulated heat storage medium; an assembly of withdrawable electric heating elements embodied in the insulated heat storage medium; at least two additional electric heating assemblies mounted adjacent said insulated heat storage medium; a casing surrounding said insulated heat storage medium and said additional heating assemblies with an intervening air space, said casing presenting near its bottom an air inlet and at a higher level an air outlet; insulated terminals mounted on the casing for connection to electric supply mains; an adjustable heat insulated baffle in said air space; a double contact thermostat adjacent the heat storage medium effective to connect said terminals to said heating assembly in said heat storage medium and alternately to one of said additional heating assemblies; and means connecting said terminals to the other of said additional heating assemblies independently of said thermostat dependently on the temperature of said heat storage medium; each of said heating elements comprised of spaced end plates, split metal tubes between said end plates, an electric resistance element in each tube, and ceramic beads supporting said element in said tube.

References Cited in the file of this patent

UNITED STATES PATENTS

| 1,069,373 | Bell | Aug. 5, 1913 |
| 1,069,376 | Bell | Aug. 5, 1913 |
| 1,651,890 | Hicks | Dec. 6, 1927 |
| 2,450,983 | Osterheld | Oct. 12, 1948 |

FOREIGN PATENTS

| 410,308 | Germany | Feb. 27, 1925 |
| 959,414 | France | Sept. 26, 1949 |
| 373,845 | Great Britain | June 2, 1932 |